Feb. 5, 1935.                C. H. BOYLES                1,989,736

METHOD OF MANUFACTURING HEATING ELEMENTS

Filed June 13, 1932

INVENTOR
Carroll H. Boyles

BY

ATTORNEYS

Patented Feb. 5, 1935

1,989,736

UNITED STATES PATENT OFFICE 1,989,736

METHOD OF MANUFACTURING HEATING ELEMENTS

Carroll H. Boyles, Milwaukee, Wis., assignor to Heating Unit Corporation, Cedarburg, Wis., a corporation of Wisconsin Application June 13, 1932, Serial No. 616,951

10 Claims. (Cl. 201—76)

The present invention pertains to a novel electrical heating element of the resistance type designed particularly for use in furnaces where comparatively high temperatures are to be obtained. The invention resides primarily in the method of making the element, and the object of the invention is to provide such a method capable of control according to requirements and whereby elements of comparatively long life and high efficiency may be produced.

The principal ingredient of the element is silicon carbide or an equivalent in powder or granular form. The granules are held together by a suitable binder such as sodium silicate or its equivalent, and after solidification of the binder, the granules are fused together by an electric current passed therethrough. It is believed that heat alone is not sufficient to properly fuse the granules and that the proper action is enhanced by the use of an electric current as the heat producing medium.

The rod initially shaped from a mixture of silicon carbide and binder is not capable of conducting a current, and in this connection another important feature of the invention is the provision of a preliminary and temporary conducting medium to be used until the silicon carbide is heated to a point where it becomes conductive. The temporary conductor consists of a coating of conducting material such as graphite and a decomposing material such as bentonite. The current initially flows through the coating, and when the latter attains a certain temperature, the bentonite has an acid reaction which destroys the conductivity of the coating. At this temperature, however, the particles of silicon carbide become conductive, and current is passed through them until they are fused together.

The invention will be more fully described with reference to the accompanying diagrammatic drawing, in which—

Reference to these views will now be made by use of like characters which are employed to designate corresponding parts throughout.

In preparing the rod or element, a mixture is made of silicon carbide powder, preferably dry, mixed with a binder such as sodium silicate. Sufficient sodium silicate is used to make a damp mixture, and 5% sodium silicate, 30° Beaumé, has been found to be adequate. It is important not to use too much binder with a high coefficient of expansion.

The rating of the finished element is determined by the mesh of the carbide powder. In general, the finer the mesh, the higher is the resistance. Usually a combination of various mesh of particles is used, and the ultimate unit resistance is determined in each case by the particular combination employed. For example, an element having a cross sectional area of 1 square inch and a resistance of .0663 ohms per linear inch is produced by the following combination:

| | Percent |
|---|---|
| Silicon carbide, 46 mesh | 20 |
| Silicon carbide, 180 mesh | 20 |
| Silicon carbide, 220 mesh | 20 |
| Silicon carbide, 500 mesh | 35 |
| Sodium silicate binder, 30° Beaumé | 5 |

Figure 1:
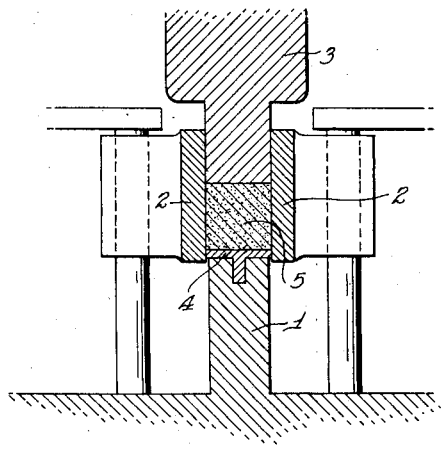
Figure 1 is a sectional view of the forming mold in closed position.
Figure 2:
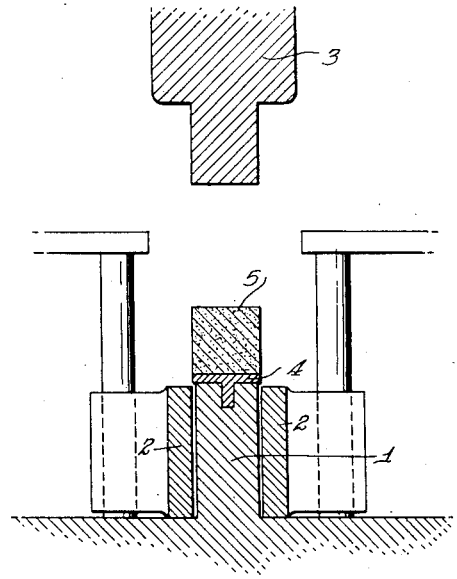
Fig. 2 is a similar view thereof in open position.

These ingredients are thoroughly mixed and then shaped in a die of the type shown in Figures 1 and 2. This die embodies a base member 1 and a pair of vertically slidable sides 2 mounted in the platen of the press. In conjunction with a ram 3 working between the sides, there is formed a cavity corresponding to the desired shape of the molded element. Upon the base 1, however, is mounted a removable bottom piece 4 on which the mixture 5 is laid when the ram 3 is lifted from the sides 2. After the ram 3 has been brought down to form the element, the sides 2 are dropped to the position shown in Figure 2, and the element is lifted with the bottom piece 4. The bottom piece facilitates carrying and handling of the element which is still in a fragile condition and incapable of sustaining its own weight.

The binder is now permitted to solidify, and this operation may be performed by placing the element in an oven and heating it to approximately 300° F. for about fifteen minutes. After this treatment, the element is strong enough to be handled and is brought to a temperature of approximately 2000° F., removed from the furnace and allowed to cool.

The next operation consists in coating the element with a conductive material which deteriorates on reaching a certain temperature. The material consists, for example, of a mixture of 10% bentonite, 40% graphite, 50% silica flour and water to 55° Beaumé. The coating is applied by merely dipping or immersing the element in this mixture.

Figure 3:
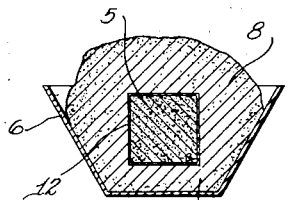
Fig. 3 is a sectional view of the rod packed in a furnace for the electrical treatment.
Figure 4:
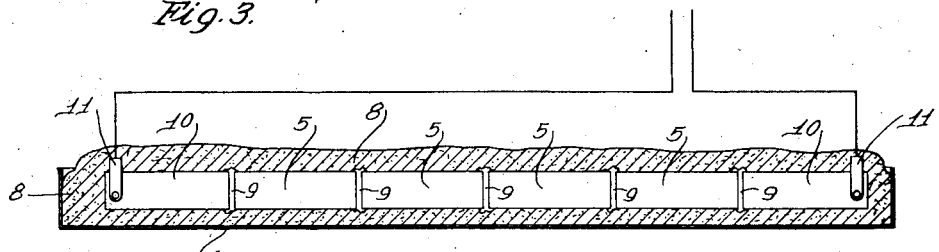
Fig. 4 is a longitudinal section of the furnace, showing the rods connected in series therein.

A number of such elements are then packed in a trough furnace 6 with a non-gassing material which is substantially inert to the rod or element except possibly for its effect in destroying the conductivity of the coating material. The packing material may consist, for example, of 60% silica, 30% carbon and 10% bentonite which has been preferably calcined to approximately 4500° F. to drive off all volatile material, and then pulverized and screened. The element 5 rests upon a layer 7 of such material in the trough furnace and is subsequently embedded in such material as indicated by the numeral 8 in Figure 3.

The several elements laid in the furnace are connected in series and joined together by a conducting substance 9 such as graphite paste. To the ends of the series are connected carbon electrodes 10 in like manner, to which in turn are joined the terminals 11 of an electric circuit. When current is first applied, the elements themselves are non-conductive, and the current therefore flows through the coating material 12. Heat is generated in the coating and transferred to the elements which thereby become conductive and begin to carry current. The current flowing through the elements generates a high degree of heat therein which renders the elements conductive of electricity, and another effect of the high temperature is to produce an acid action in the bentonite which destroys the coating, whereupon the elements carry practically all the current. The continued flow of current through the elements causes the particles thereof to fuse together, and in this connection it is noted that the current has an action on the particles, in addition to its mere heating effect, in bringing about the proper fusing and interaction among the particles to produce a successful and efficient element.

As the current increases, the resistance drops, and the voltage may be lowered accordingly by means of familiar control devices in the circuit. The final amperage should slightly exceed the amperage intended to be supplied to the elements in service and at the same time must be sufficient to fuse the particles of carbide together. The current characteristics for fusion depend on the size of the particles, and it will thus be seen that the service rating of the element also depends on the size of the particles. In service, care must be taken not to exceed the fusion amperage of the element, and the applied voltage must be governed accordingly, or in other words, the size of particles must be selected in view of the intended operating conditions.

As already indicated, a given element may contain several different mesh of particles in a combination determined according to the desired rating, and such a combination is designated in the claims by the expression "mixed mesh". It is also to be understood that the scope of the invention embraces not only the specific materials named herein but equivalents thereof for accomplishing the same results. The binder as well as the coating and packing materials may thus be varied by the substitution of equivalent substances.

What I claim is:

1. The method of making electrical heating elements consisting in dampening dry granular silicon carbide with a binder, shaping the same into a rod, allowing the binder to solidify, heating the rod to about 2000° F., coating the rod, after cooling, with a mixture of bentonite, graphite, silica flour and water, packing the rod in a non-gassing material, and passing electrical current first through said coating and then through the rod proper, until the carbide particles are fused together.

2. The method of making electrical heating elements consisting in dampening dry granular silicon carbide with a binder, shaping the same into a rod, allowing the binder to solidify, heating the rod to about 2000° F., coating the rod, after cooling, with a mixture of 10% bentonite, 40% graphite, 50% silica flour and water to 55° Beaumé, packing the rod in a non-gassing material, and passing electrical current first through said coating and then through the rod proper, until the carbide particles are fused together.

3. The method of making electrical heating elements consisting in dampening dry granular silicon carbide with a binder, shaping the same into a rod, allowing the binder to solidify, heating the rod to about 2000° F., coating the rod, after cooling, with a mixture of bentonite, graphite, silica flour and water, packing the rod in a calcined mixture of silica, carbon and bentonite, and passing electrical current first through said coating and then through the rod proper, until the carbide particles are fused together.

4. The method of making electrical heating elements consisting in dampening dry granular silicon carbide with a binder, shaping the same into a rod, allowing the binder to solidify, heating the rod to about 2000° F., coating the rod, after cooling, with a mixture of bentonite, graphite, silica flour and water, and packing the rod in a calcined mixture of 60% silica, 30% carbon and 10% bentonite, and passing electrical current first through said coating and then through the rod proper, until the carbide particles are fused together.

5. The method of making electrical heating elements consisting in dampening dry granular silicon carbide with a binder, shaping the same into a rod, allowing the binder to solidify, heating the rod to about 2000° F., coating the rod, after cooling, with a mixture of bentonite, graphite, silica flour and water, packing the rod in a calcined mixture of silica, carbon and bentonite, calcined, pulverized and screened, and passing electrical current first through said coating and then through the rod proper, until the carbide particles are fused together.

6. The method of making electrical heating elements consisting in dampening dry granular silicon carbide with a binder, shaping the same into a rod, allowing the binder to solidify, heating the rod to about 2000° F., coating the rod, after cooling, with a mixture of 10% bentonite, 40% graphite, 50% silica flour and water to 55° Beaumé, packing the rod in a calcined mixture of silica, carbon and bentonite, and passing electrical current first through said coating and then through the rod proper, until the carbide particles are fused together.

7. The method of making electrical heating elements consisting in dampening dry granular silicon carbide with a binder, shaping the same into a rod, allowing the binder to solidify, heating the rod to about 2000° F., coating the rod, after cooling, with a mixture of 10% bentonite, 40% graphite, 50% silica flour and water to 55° Beaumé, packing the rod in a calcined mixture of 60% silica, 30% carbon and 10% bentonite, and passing electrical current first through said coating and then through the rod proper, until the carbide particles are fused together.

8. The method of making electrical heating elements consisting in dampening dry granular silicon carbide with a binder, shaping the same into a rod, allowing the binder to solidify, heating the rod to about 2000° F., coating the rod, after cooling, with a mixture of bentonite, graphite, silica flour and water, packing the rod in a mixture of 60% silica, 30% carbon and 10% bentonite, calcined, pulverized and screened, and passing electrical current first through said coating and then through the rod proper, until the carbide particles are fused together.

9. The method of making electrical heating elements consisting in dampening dry granular silicon carbide of mixed mesh with a binder, shaping the same into a rod, allowing the binder to solidify, heating the rod to about 2000° F., coating the rod, after cooling, with a mixture of bentonite, graphite, silica flour and water, packing the rod in a calcined mixture of silica, carbon and bentonite, and passing electrical current first through said coating and then through the rod proper, until the carbide particles are fused together.

10. The method of making electrical heating elements consisting in dampening dry granular silicon carbide of mixed mesh with a binder, shaping the same into a rod, allowing the binder to solidify, heating the rod to about 2000° F., coating the rod, after cooling, with a mixture of bentonite, graphite, silica flour and water, packing the rod in a mixture of 60% silica, 30% carbon and 10% bentonite, calcined, pulverized and screened, and passing electrical current first through said coating and then through the rod proper, until the carbide particles are fused together.

CARROLL H. BOYLES.